(12) United States Patent
Baro et al.

(10) Patent No.: US 7,484,793 B2
(45) Date of Patent: Feb. 3, 2009

(54) ROOF OF A CAB, IN PARTICULAR FOR AN AGRICULTURAL MACHINE

(75) Inventors: Sergio Baro, Turin (IT); Silvano Bertaglia, Turin (IT)

(73) Assignee: Denso Thermal Systems SPA, Turin (IT)

( * ) Notice: Subject to any disclaimer, the term of this patent is extended or adjusted under 35 U.S.C. 154(b) by 69 days.

(21) Appl. No.: 11/560,236

(22) Filed: Nov. 15, 2006

(65) Prior Publication Data

US 2007/0163747 A1    Jul. 19, 2007

(30) Foreign Application Priority Data

Nov. 16, 2005   (EP) .................................. 05425809

(51) Int. Cl.
*B60R 27/00*   (2006.01)
(52) U.S. Cl. ................................................ 296/190.09
(58) Field of Classification Search ............ 296/190.09, 296/190.08, 190.01, 210; 454/136, 137
See application file for complete search history.

(56) References Cited

U.S. PATENT DOCUMENTS

| | | | |
|---|---|---|---|
| 4,641,502 A | | 2/1987 | Aldrich et al. |
| 4,721,031 A | * | 1/1988 | Nakata et al. ............... 454/121 |
| 5,690,549 A | * | 11/1997 | Webb et al. ................. 454/137 |
| 5,921,619 A | | 7/1999 | Cederberg et al. |
| 6,279,978 B1 | * | 8/2001 | Schreyer et al. ............ 296/39.3 |
| 6,309,012 B1 | * | 10/2001 | Fryk et al. .................. 296/211 |
| 6,322,136 B2 | * | 11/2001 | Boyce et al. ................ 296/214 |
| 6,398,294 B1 | * | 6/2002 | Bollweg et al. ........ 296/190.09 |
| 6,755,732 B2 | * | 6/2004 | Ruckert et al. .............. 454/158 |
| 6,780,097 B2 | * | 8/2004 | Shuttleworth et al. ....... 454/136 |
| 6,814,397 B2 | * | 11/2004 | Henderson et al. ....... 296/184.1 |
| 6,857,677 B1 | * | 2/2005 | Giles et al. ................... 296/43 |
| 6,979,037 B2 | * | 12/2005 | Morrison ................... 296/37.5 |
| 7,052,033 B2 | * | 5/2006 | McDonell ................... 280/656 |
| 7,070,227 B2 | * | 7/2006 | Hunt ....................... 296/183.1 |
| 7,104,582 B2 | * | 9/2006 | Morrison ................... 296/37.5 |
| 7,201,453 B2 | * | 4/2007 | Vandewinckel et al. ..... 298/1 C |
| 7,222,905 B2 | * | 5/2007 | Jaeck ......................... 296/1.07 |
| 7,252,317 B2 | * | 8/2007 | Boe ............................. 296/43 |
| 7,252,585 B2 | * | 8/2007 | Ichikawa et al. ............ 454/137 |

(Continued)

FOREIGN PATENT DOCUMENTS

DE      43 15 447      11/1994

OTHER PUBLICATIONS

EP Search Report, Application No. 05425809.0, Dated May 24, 2006.

*Primary Examiner*—H Gutman
(74) *Attorney, Agent, or Firm*—Patterson & Sheridan, LLP

(57) ABSTRACT

A roof of a cab comprising a load-bearing structure made of plastic material, and a heat exchange assembly for treating an airflow, the heat exchange assembly being borne by the structure made of plastic material and comprising at least one heat exchanger and at least one ventilation unit. The load bearing structure comprises a central section in which is housed the heat exchange assembly and in which is defined a chamber for collecting the treated airflow. The load bearing structure further comprises a central section for the distribution of the treated airflow towards the interior of the cab, the annular channel surrounding the central section and communicating with the collection chamber.

8 Claims, 5 Drawing Sheets

U.S. PATENT DOCUMENTS

| | | | |
|---|---|---|---|
| 7,275,902 B1 * | 10/2007 | Klotz | 410/42 |
| 2001/0011834 A1 * | 8/2001 | Boyce et al. | 296/190.09 |
| 2004/0245805 A1 * | 12/2004 | Jaeck | 296/182.1 |
| 2005/0269836 A1 * | 12/2005 | Boe | 296/186.5 |
| 2007/0205633 A1 * | 9/2007 | Waco et al. | 296/190.09 |
| 2007/0210618 A1 * | 9/2007 | Hill et al. | 296/190.09 |
| 2007/0222247 A1 * | 9/2007 | Jaeck | 296/26.02 |

* cited by examiner

ROOF OF A CAB, IN PARTICULAR FOR AN AGRICULTURAL MACHINE

CROSS-REFERENCE TO RELATED APPLICATIONS

This application claims benefit of European patent application number 05425809.0, filed Nov. 16, 2005, which is herein incorporated by reference.

BACKGROUND OF THE INVENTION

Field of the Invention

The present invention relates to a roof of a cab, in particular for an agricultural machine.

SUMMARY OF THE INVENTION

More specifically, the invention relates to a roof of a cab comprising:

a load-bearing structure made of plastic material, and a heat exchange assembly for treating an airflow, the heat exchange assembly being borne by the structure made of plastic material and comprising at least one heat exchanger and at least one ventilation unit.

The object of the present invention is to provide a roof of the type specified above having a simple, economical structure which enables to improve the distribution of the treated airflow within the cab.

Another object of the present invention is to provide a modular cab which can be easily adapted to different models of cab.

According to the present invention, said objects are achieved by a roof of a cab having the characteristics set out in the claims.

BRIEF DESCRIPTION OF THE DRAWINGS

The present invention generally The characteristics and the advantages of the present invention shall become readily apparent in the detailed description that follows, provided purely by way of non limiting example, in which.

DETAILED DESCRIPTION

Figure 1:
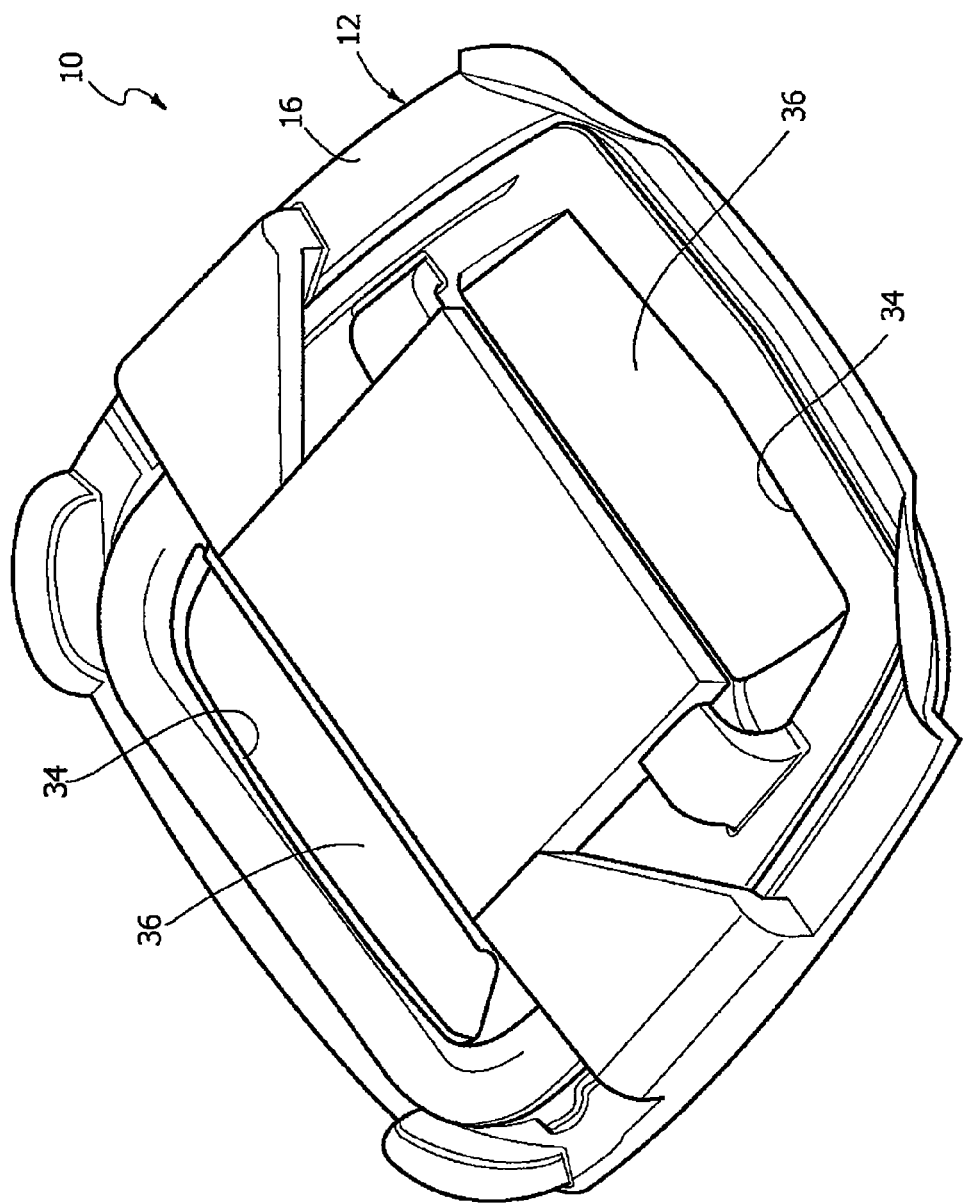
FIG. 1 is a perspective view of a roof according to the present invention.
Figure 2:
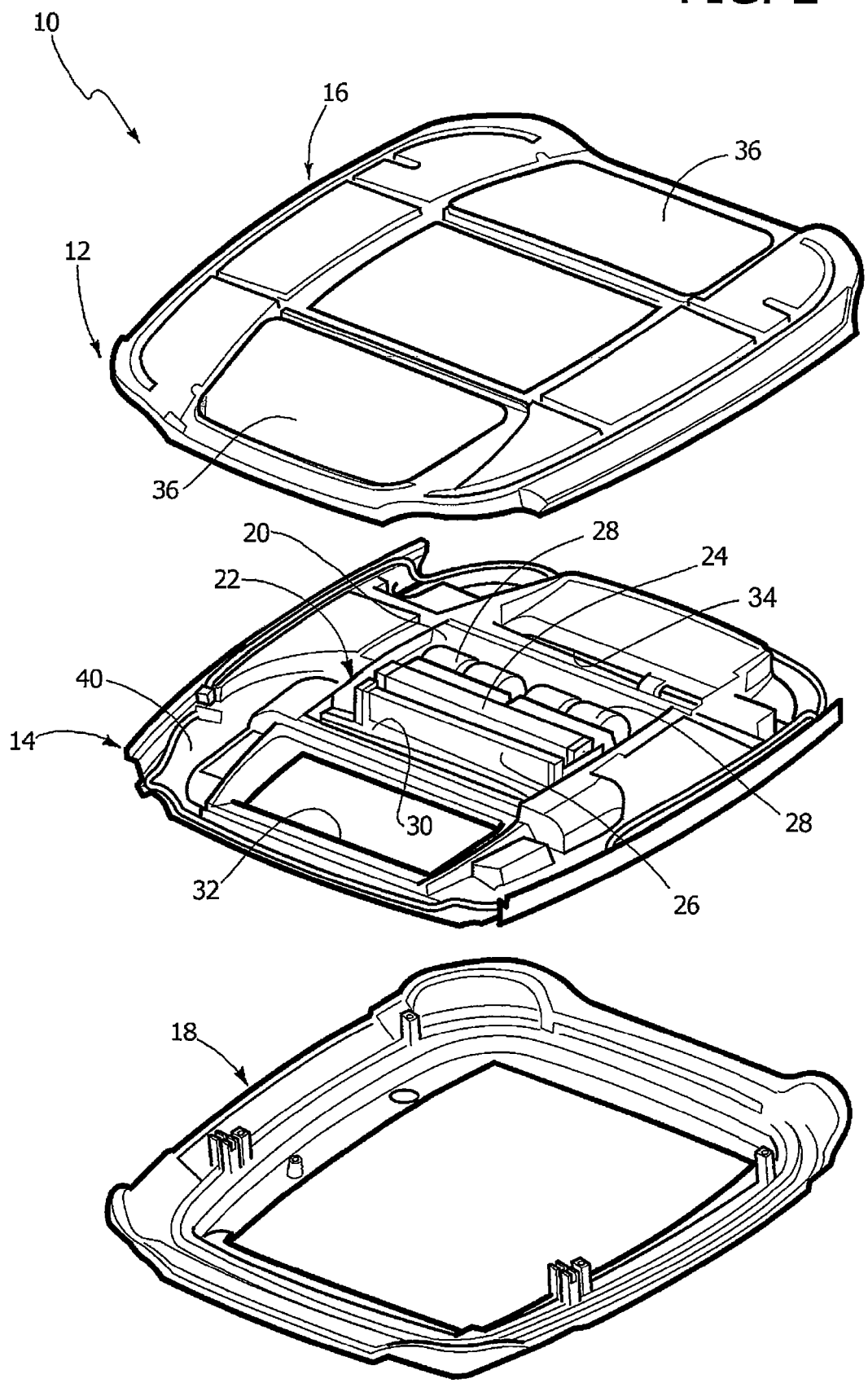
FIG. 2 is an exploded perspective view of the roof of FIG. 1.

With reference to FIGS. 1 and 2, the reference number 10 designates a roof according to the present invention for the cab of an agricultural machine (not shown). The roof 10 comprises a load-bearing structure 12 made of plastic material obtained, for example, by injection moulding.

FIG. 2 shows that the load-bearing structure 12 is formed by three main modular elements: a central support element 14, an upper covering element 16 and a lower coupling element 18. The three elements 14, 16 and 18 embody a modular structure in which the central support element 14 can be associated to covering elements 16 and to different kinds of coupling elements 18 in such a way as to obtain structures which, with the same central support element 14, can be mounted on cabs of different types.

The coupling element 18 of the structure 12 constitutes the interface between the roof 10 and the cab. Consequently, using coupling elements 18 with different shapes and dimensions it is possible to mount the roof 10 on cabs of different types. The upper covering element 16, in addition to the function of upper cover of the central support element 12, has the function of personalising the roof from the aesthetic point of view. By using covering elements 16 of different types, the overall appearance of the roof 10 can be varied.

With reference to FIG. 2, the lower connecting module 18 has substantially a frame shape and it is fastened to the lower side of the central support element 14.

Figure 4:
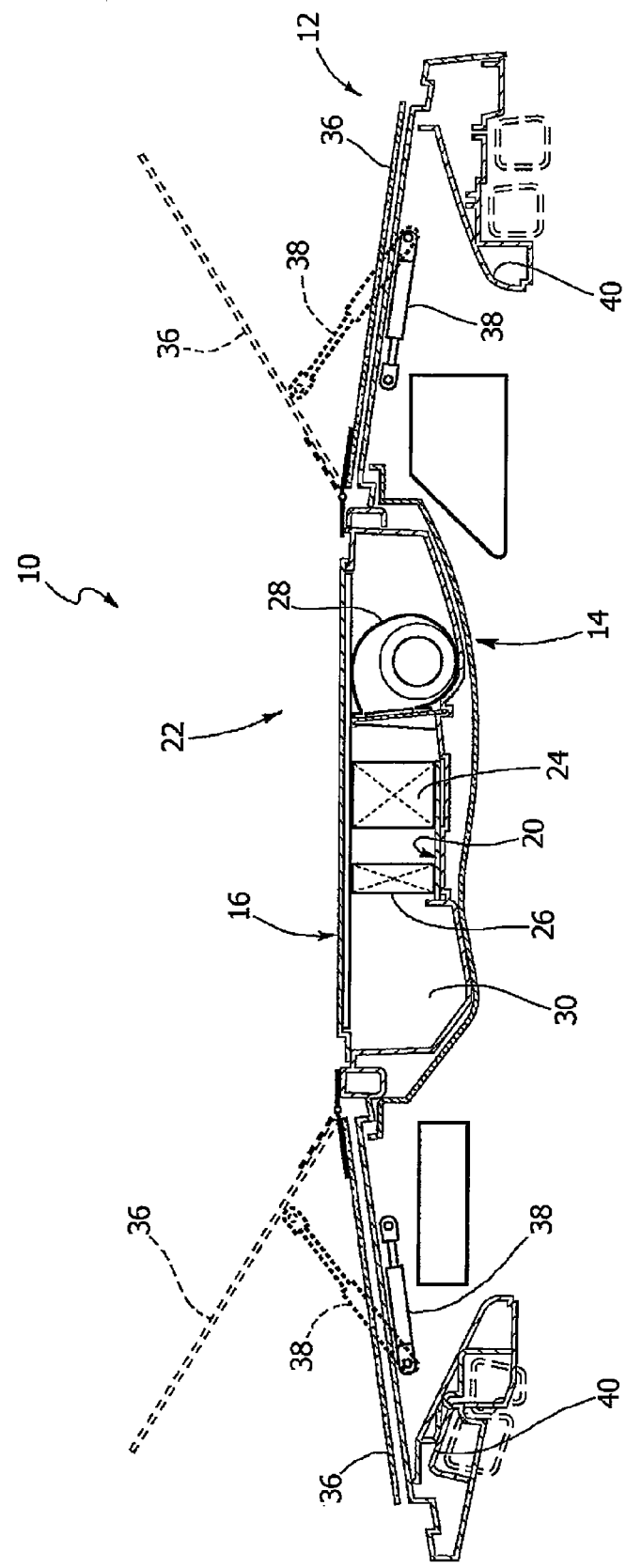
FIG. 4 is a section according to the line IV-IV of FIG. 3.

The central support element 14 comprises a central section 20 in which is housed a heat exchange assembly 22 for the treatment of an airflow. The heat exchange assembly 22 comprises at least one heat exchanger and at least one ventilation unit. In the example shown in the figures, the heat exchange assembly 22 comprises an evaporator 24, a heating radiator 26 and two electrical fans 28 positioned to generate an airflow that traverses in succession the evaporator 24 and the heating radiator 26. With reference in particular to FIG. 4, the airflow produced by the fans 28, after traversing in succession the evaporator 24 and the heating radiator 26, reaches a collection chamber 30 which extends in transverse direction for a width that is substantially equal to the width of the heat exchangers 24, 26.

Figure 3:
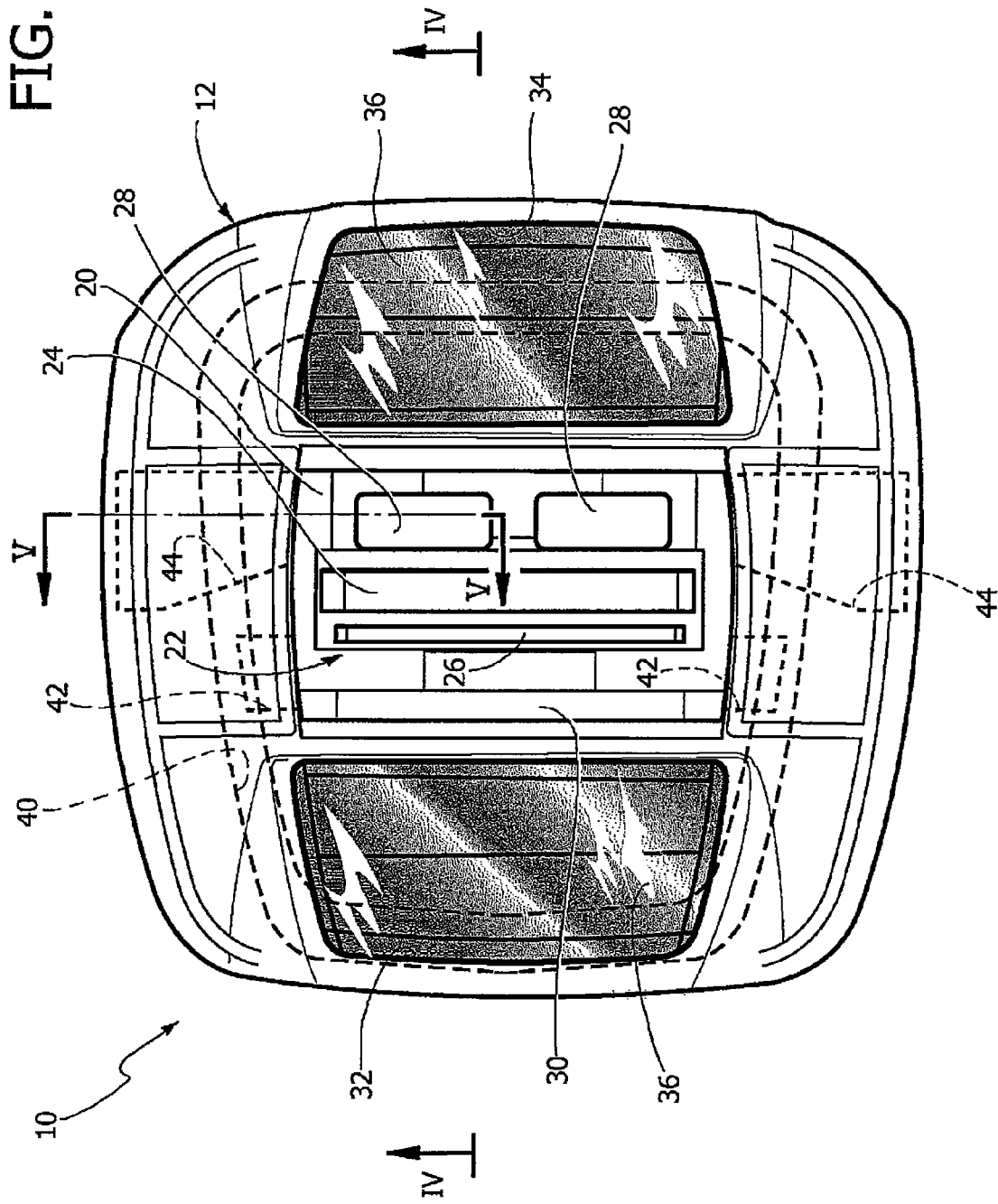
FIG. 3 is a plan view of the roof according to the present invention.

With reference to FIGS. 2, 3 and 4 in the embodiment illustrated by way of example in the figures, the roof 10 comprises openings 32, 34, positioned respectively in front and behind relative to the central section 22 in which is housed the treatment assembly 22. The openings 32, 34 are closed by respectively openable panels 36 borne by the upper closure element 16. The openable panels 36 can be constituted by clear material, e.g. glass or clear plastic material, and they are preferably associated to air springs 38 whose purpose is to hold the panels 36 in raised position as shown with dashed line in FIG. 4.

With reference to FIG. 3, the load-bearing structure 12 of the roof 10 comprises a distribution channel 40 for the distribution of the treated airflow within the cab. The distribution channel 40 has a closed annular shape and it surrounds the central section 20 in which is housed the treatment assembly 22. The annular channel 40 communicates with the collection chamber 30 of the treated airflow through two lateral branches 42 of the chamber 30. The annular distribution channel 40 also communicates with conduits for the exit of the airflow (not shown) which send the treated airflow towards selected areas of the cab, e.g. towards the windshield, towards the rear window, towards frontal distribution outlets positioned in the dashboard and towards every other outlet or opening for the diffusion of the treated airflow in the cab of the vehicle.

The whole airflow exiting the treatment assembly 22 is conveyed into the collection chamber 30. The treated airflow exits the chamber 30 through the two lateral branches 42 and enter the annular distribution channel 40. The treated airflow is bled from the annular distribution conduit 40 and sent inside the cab.

This system makes particular simple the distribution of the treated airflow inside the cab. In particular, it is rather simple to provide conduits for the distribution of the airflow which extend in vertical direction along the vertical uprights situated in the four vertices of the cab and which communicate superiorly with the annular distribution channel 40. The distribution channel 40 forms a sort of annular manifold, extending in a horizontal plane, which carries the treated airflow along a closed path above the cab.

Figure 5:
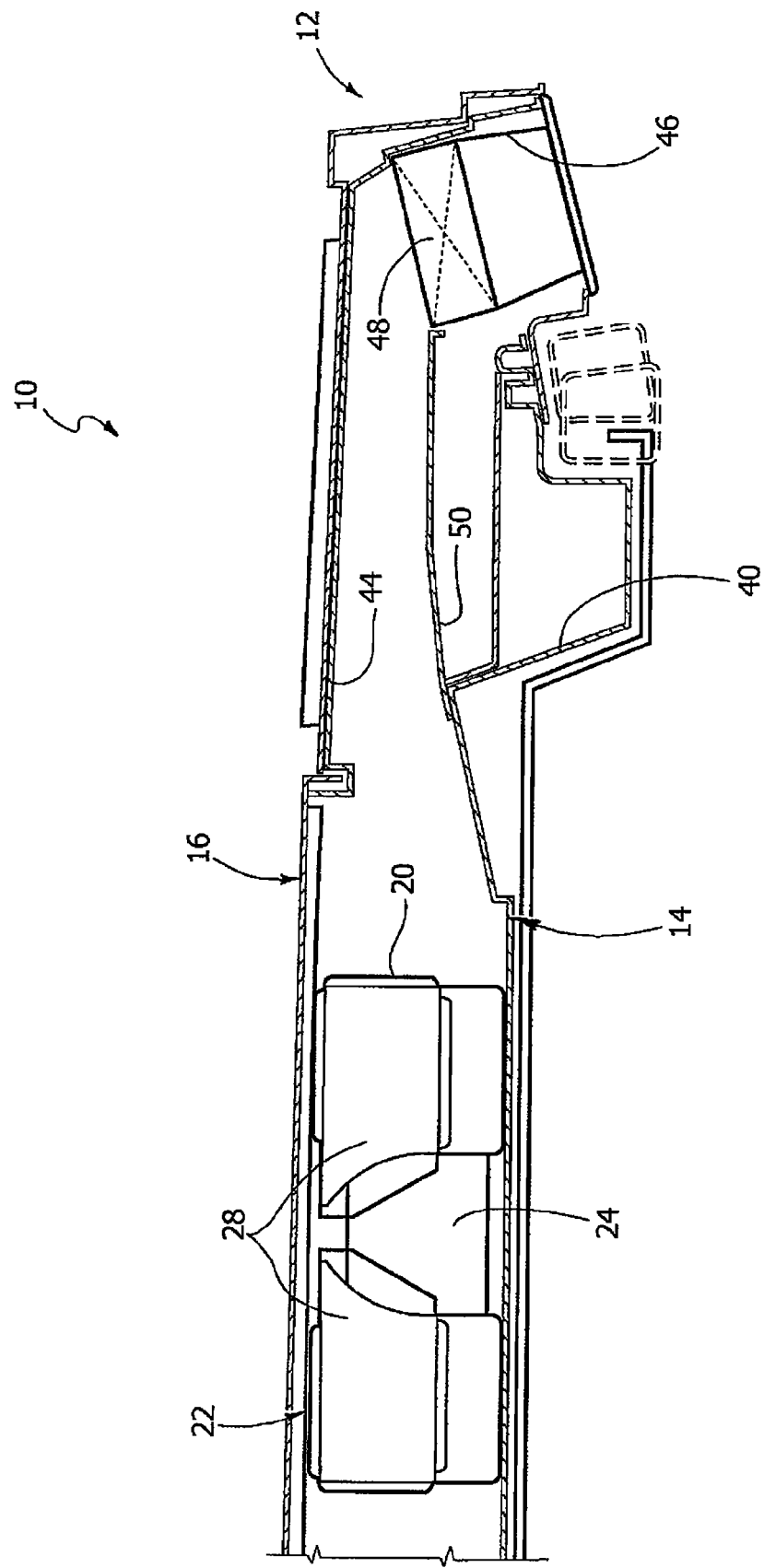
FIG. 5 is a section according to the line V-V of FIG. 3.

With reference to FIGS. 3 and 5, the load-bearing structure 12 of the roof 10 comprises on each side a conduit 44 for intaking air from the exterior. The conduits 44 extend laterally in transverse direction and place in communication the central section 20 in which is housed the treatment group 22 with air intake openings 46 situated outside the cab. Preferably, at each air intake opening 46 is situated a filter 48.

With reference to FIG. 5, the structure 12 of the roof 10 can also be provided with a recirculation conduit 50 able to withdraw an airflow from the interior of the cab for feeding the treatment assembly 22. As shown in FIG. 5, in a section in a transverse plane a preferred arrangement provides for the conduits 40, 50 and 54 to be substantially superposed on each other. The annular distribution conduit 40 is positioned down and the recirculation conduit 50 is located in an intermediate position between the intake conduit 44 and the annular distribution conduit 40.

While the foregoing is directed to embodiments of the present invention, other and further embodiments of the invention may be devised without departing from the basic scope thereof, and the scope thereof is determined by the claims that follow.

The invention claimed is:

1. A roof of a cab comprising:
a load-bearing structure made of plastic material, and
a heat exchange assembly for treating an airflow, comprising at least one heat exchanger and at least one ventilation unit, the heat exchange assembly being borne by a central section of the load-bearing structure, said central section including a collection chamber for collecting a treated airflow, and
wherein the load-bearing structure comprises a closed annular channel for the distribution of the treated airflow towards the interior of the cab, the annular channel surrounding said central section and communicating with said collection chamber,
wherein the load bearing structure comprises:
    a central modular element housing the heat exchange assembly;
    a modular connecting element set on the lower side of the central modular element; and
    a modular closure element set on the upper side of the central modular element
    wherein said modular elements are detached, independent units which are superposed and fastened to each other.

2. The roof as claimed in claim 1, wherein the central modular element is provided with two openings situated to the front and to the rear with respect to the central section and wherein the modular closure element comprises two openable panels which close said two openings 3. The roof as claimed in claim 1, wherein the annular distribution channel communicates with two lateral branches of the collection chamber.

4. The roof as claimed in claim 1, wherein the central section of the load-bearing structure communicates with two lateral channels for intaking air from the exterior.

5. The roof as claimed in claim 4, wherein the load-bearing structure comprises a recirculation conduit for intaking air from the interior of the cab.

6. The roof as claimed in claim 5, wherein the annular channel, the recirculation conduit and the lateral channels for intaking air from the exterior are mutually superposed in the vertical direction.

7. A roof of a cab, comprising:
a load-bearing structure made of plastic material, and
a heat exchange assembly for treating an airflow, the heat exchange assembly being borne by the structure made of plastic material and comprising at least one heat exchanger and at least one ventilation unit,
wherein the load bearing structure comprises a central section in which the heat exchange assembly is housed and in which is defined a collection chamber for collecting the treated airflow, and
wherein the load-bearing structure comprises a closed annular channel for the distribution of the treated airflow towards the interior of the cab, the annular channel surrounding said central section and communicating with said collection chamber,
wherein the load-bearing structure also comprises a central modular element bearing the heat exchange assembly, a modular connecting element fastened on the lower side of the central modular element and a modular closure element fastened on the upper side of the central modular element, the said modular elements are superposed and fastened to each other, and
wherein the central modular element is provided with two openings situated to the front and to the rear with respect to the central section and wherein the modular closure element comprises two openable panels which close said two openings.

8. A roof of a cab, comprising:
a load-bearing structure made of plastic material; and
a heat exchange assembly for treating an airflow, the heat exchange assembly being borne by the structure made of plastic material and comprising at least one heat exchanger and at least one ventilation unit,
wherein the load bearing structure comprises a central section in which the heat exchange assembly is housed and in which is defined a collection chamber for collecting the treated airflow and wherein the central section of the load-bearing structure communicates with two lateral channels for intaking air from the exterior,
wherein the load-bearing structure comprises a closed annular channel for the distribution of the treated airflow towards the interior of the cab, the annular channel surrounding said central section and communicating with said collection chamber, and
wherein the annular channel, a recirculation conduit and the lateral channels forintaking air from the exterior are mutually superposed in the vertical direction.

* * * * *